United States Patent [19]
Lemont et al.

[11] 3,948,295
[45] Apr. 6, 1976

[54] INSULATION SYSTEM
[75] Inventors: Harold E. Lemont, Calabasas; Robert C. Miller, Encino, both of Calif.
[73] Assignee: Summa Corporation, Culver City, Calif.
[22] Filed: Apr. 18, 1973
[21] Appl. No.: 352,309

Related U.S. Application Data
[63] Continuation-in-part of Ser. No. 272,469, July 17, 1972, abandoned.

[52] U.S. Cl. .............. 138/147; 138/149; 138/148; 29/183.5; 250/517; 62/451
[51] Int. Cl. ....... F16l 59/02; F16l 59/08; B32b 1/08
[58] Field of Search .................. 161/47, 50–52, 161/72, 89, 139, 155, 156, 213, 403, 410; 138/149

[56] References Cited
UNITED STATES PATENTS

| 273,688 | 3/1883 | Kelly | 161/119 |
|---|---|---|---|
| 2,020,060 | 11/1935 | Hunter | 161/72 |
| 2,179,057 | 11/1939 | Schuetz | 161/127 |
| 2,514,170 | 7/1950 | Walter et al. | 161/73 |
| 2,726,977 | 12/1955 | See et al. | 161/50 |
| 3,007,596 | 11/1961 | Matsch | 220/9 |
| 3,715,265 | 2/1973 | Allen et al. | 161/125 |
| 3,793,131 | 2/1974 | Hedges | 156/213 X |
| 3,810,491 | 5/1974 | Hildebrandt | 138/149 |

*Primary Examiner*—Harold Ansher
*Attorney, Agent, or Firm*—George F. Smyth

[57] ABSTRACT

A thermal insulation composite includes at least a first metallic skin sheet, and a plurality of non-combustible metallic filaments randomly interlocked to form a wool and affixed to said first skin sheet. A second metallic skin sheet may be affixed to said wool and said first sheet, or the second skin sheet may be a surface of the structure to be insulated. A fluid is present in the interstices of the filaments and in the zone between the skin sheets. Each of the filaments has a significant length to cross-sectional diameter ratio to minimize its thermal conductivity. The filaments also preferably have a circular cross section to minimize the area of contact and hence the heat conducted between adjacent filaments. In this manner, the conductivity of the wool is made primarily dependent upon the thermal conductivity of the fluid in the interstices of the filaments. Heat transmission by radiation is inhibited by providing a plurality of radiation shields interposed between multiple layers of the wool. The skin sheets, wool, and radiation shields are bonded by stitches or staples to form an insulation blanket. The interstices of the filaments are of many different sizes so that the insulation has characteristics for absorbing sound waves over a significant band of frequencies. The composite may be used to insulate ducts, airfoil surfaces, fire walls and to form fireproof garments, and has the unique capability of being fabricated into a variety of structural shapes.

34 Claims, 19 Drawing Figures

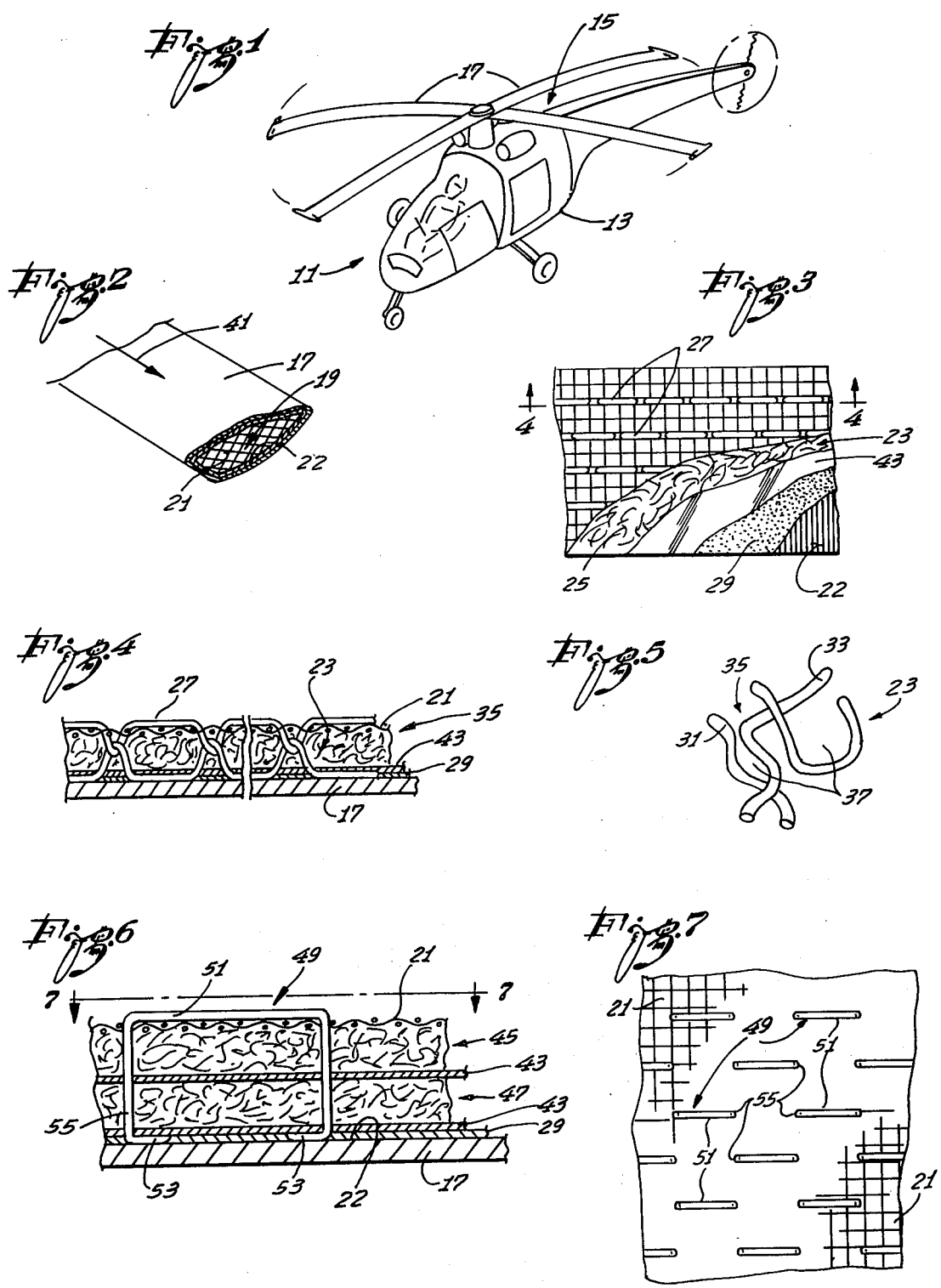

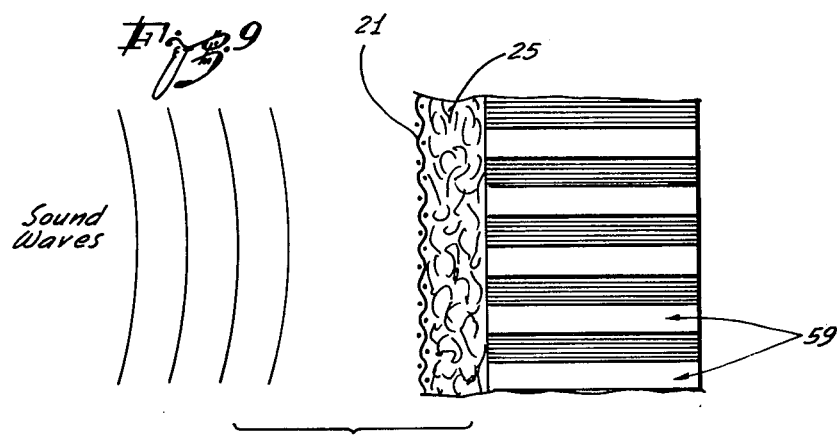
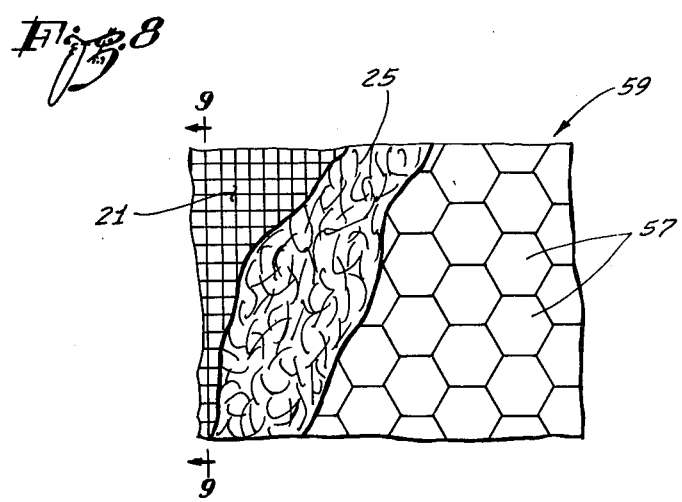

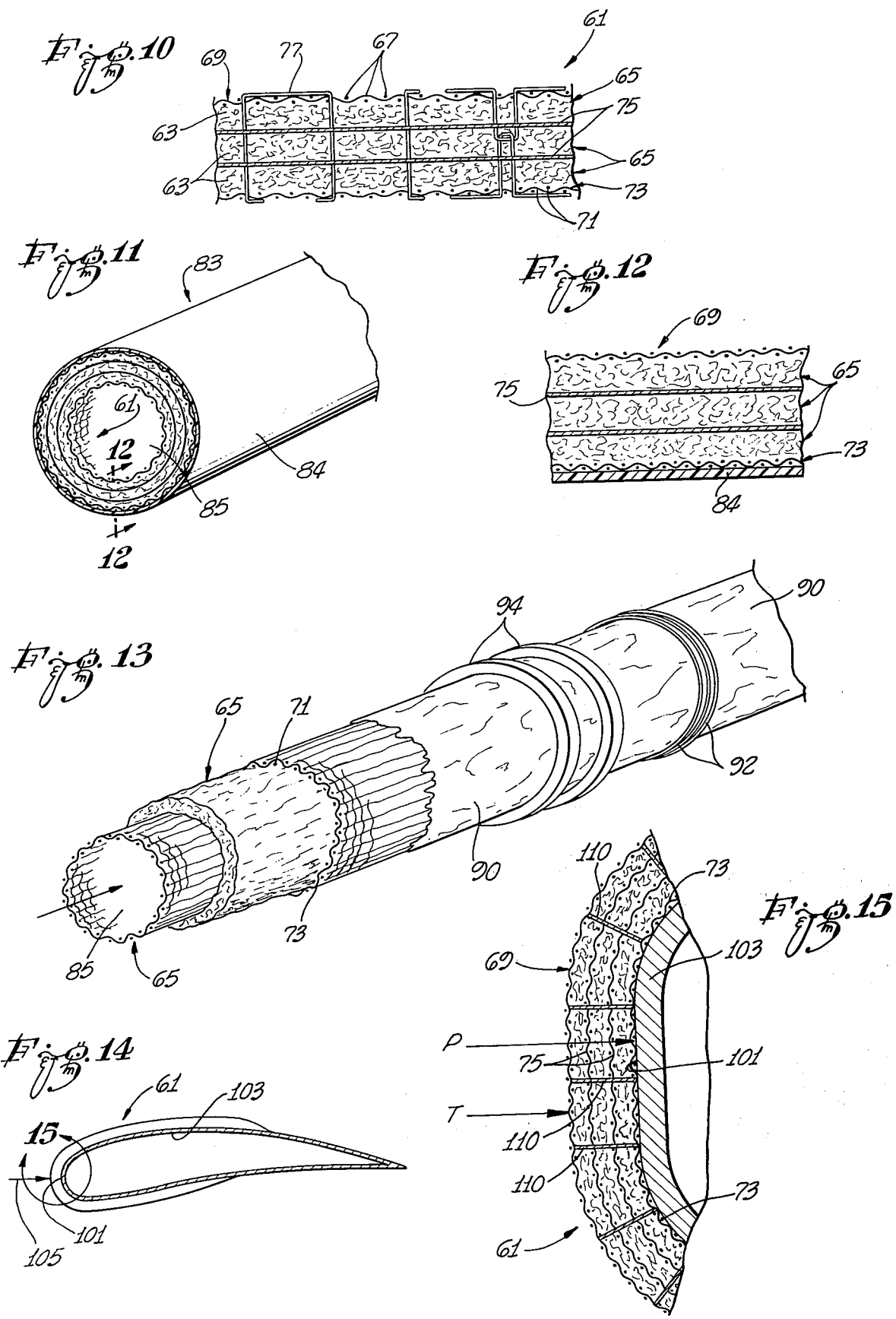

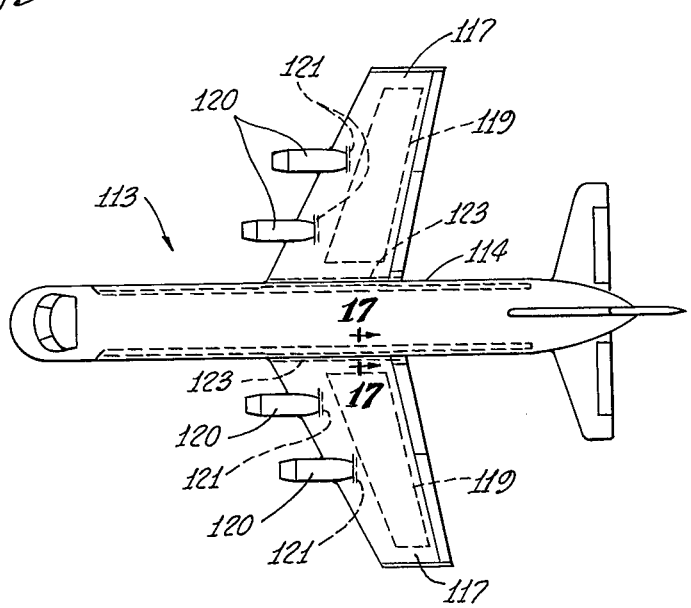
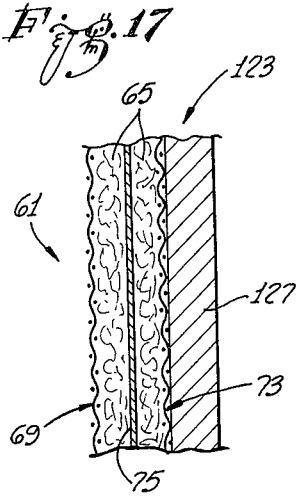
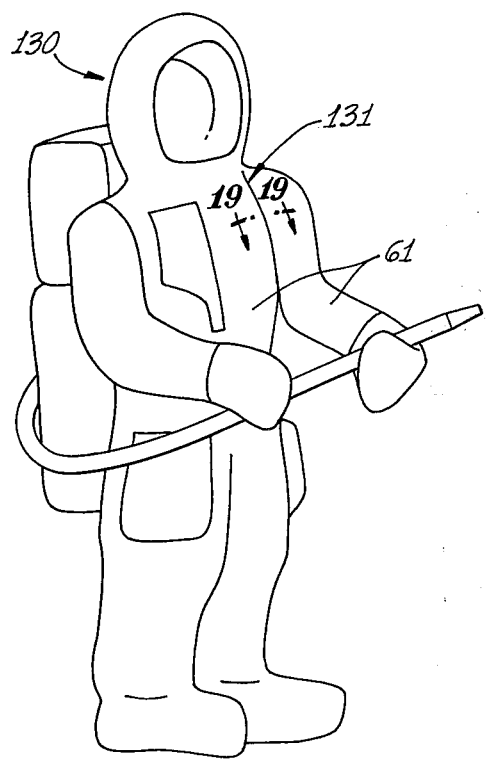
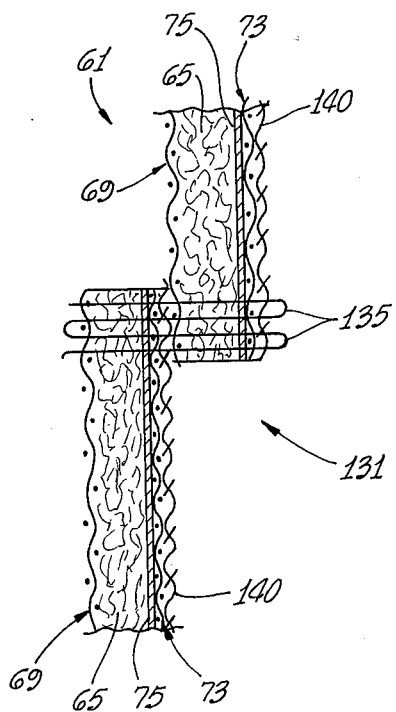

INSULATION SYSTEM

CROSS-REFERENCE TO RELATED APPLICATIONS

This application is a continuation-in-part of U.S. application Ser. No. 272,469, filed July 17, 1972, and assigned to the same assignee now abandoned. Reference is also made to U.S. application Ser. No. 272,468, filed July 17, 1972, and Ser. No. 352,218, filed Apr. 18, 1973 (Docket No. D-4649a), all assigned to the same assignee.

BACKGROUND OF THE INVENTION

1. Field of the Invention

This invention relates generally to thermal insulation, and more specifically to an improved thermal insulation including relatively long non-combustible metallic filaments randomly interlocked to form a wool.

2. Description of the Prior Art

The prior art includes numerous types of insulations, each having particular physical and thermal characteristics, thereby rending these different materials particularly adaptable to a given application.

For example, U.S. Pat. No. 273,688 of Mar. 6, 1883 describes a metal mesh positioned adjacent to a conduit so as to keep a thermally non-conducting plastic mass or cement spaced from the conduit thus forming a dead air space between the conduit and the non-conducting mass.

U.S. Pat. No. 2,179,057 of Nov. 7, 1939 describes the use of an asbestos paper having nibs on it. Nibbed sheets are laid up such that each nibbed section forms an air cell. Also disclosed in the use of aluminum foil laminated to the asbestos paper nibbed sheets.

U.S. Pat. No. 2,514,170 of July 4, 1950 relates to a thermal insulation for jet engines and the like in which various forms are illustrated. In one form, an open metal mesh supports a pocket filled with asbestos and the like in spaced relation to a tubular member. In another form, a radiation shield in the form of a foil is used, the outer surface being an asbestos cloth. Several other forms of thermal insulation are shown, each using wire mesh members.

U.S. Pat. No. 3,007,596 of Nov. 7, 1961 describes an insulation made up of alternate layers of radiation shield material and an insulation material such as glass wool.

For high temperature use, e.g. 200° to 4000°F. various materials are commercially available, but are non-metallic in nature. Typical are aluminum silicate powders, silica fibers, zirconium oxide powders, potassium titanate, glass fibers, aluminum fibers, expanded pearlite, collodial silica and silica aerogels. These materials may be used as ceramic foams (silica carbide, aluminum zirconia and silica) with organic binders such as an epoxy resin. Multilayer composites of fiber glass or foam blankets are also available.

While certain of these materials have low thermal conductivity; e.g. about 0.2 btu/hr.-ft$^2$-°F/inch for mixture of powders and polymer binders, they also have high densities, for example 20 to 30 lbs/ft$^3$, although some commercially available materials, in the form of batting, have densities as low as 3.5 lbs/ft$^3$.

As a general rule, these materials have low compressive strengths, i.e. about 3600 lb/in$^2$ at densities of 30 lbs/ft$^3$. Moreover, there are serious limitations on the environments in which they can be used, e.g. chemical, structural etc. In some cases, there may be erosion problems or moisture affinity or affinity for certain gases which adversely affect performance of the insulation system. Weight and thickness may also present some problems especially when the insulation is to be used in the aircraft or aerospace fields, in that in order to provide adequate protection, the insulation may be too bulky, too heavy or inherently incapable of providing the structural strengths needed for the severe physical environment in which the insulation is to be used.

For example, in helicopter rotor blades which are designed to provide a gas duct for engine exhaust, it is desirable to insulate the interior surface of the rotor blade from the exhaust gases. In such an application, the exhaust gases may be as high as 1000°F. at a pressure of 40 pounds per square inch absolute with an internal flow Mach number of 0.45. From these extreme conditions inside the rotor blade, it is desirable to limit the temperature of the rotor blade to a value such as 180°F. for several reasons. At a temperatures of 180°F., the blade can be formed from conventional materials. This would be advantageous at least from economical and structural standpoints. Also, by decreasing the temperature of the blade, the infrared signature is lowered so that the helicopter cannot be as easily detected at night. This is desirable in military applications.

In such a severe environment an insulation having physical characteristics for withstanding a temperature such as 1000°F. and thermal characteristics including a thermal conductivity as low as air would be quite desirable. The insulation systems presently available which have these characteristics unfortunately are deficient structurally. For example, some prior art and presently available insulation systems include chaalk-like materials which have a tendency to crumble and spall. These characteristics have made such insulation systems not well suited for use in severe environments such as a rotor blade where extreme vibration and centrifugal force loads are present. The chalk-like materials are moisture absorbent and chemically reactive with exhaust products. High temperatures have vaporized the moisture and altered the composition of the insulation itself to produce undesirable gases within the insulation. This is typically referred to as outgassing. Furthermore, in proximity to the high velocity fluids, the chalk-like materials can be expected to erode so as to decrease the thickness of the insulation. A reduced thickness would be detrimental not only to the structural characteristics but also to the thermal characteristics of the insulation.

By way of example, ducts for transporting hot fluids, such as gases, have typically been insulated by applying an insulation blanket to the outer surface of the duct. Although the insulation blanket has provided a cooler outer surface, it has been necessary to form the duct from materials which can withstand the temperature of the fluid. In most cases these ducts have been formed from high density metals which have made them particularly heavy for aircraft applications. These metals have not been thermally relieved so that thermal expansion has been a problem in some applications.

Many of the advanced insulation systems having a thermal conductivity substantially equal to that of air have included chalk-like materials which have crumbled and spalled, especially in severe environments wherein vibration and significant forces have been encountered. These insulation systems have also been water absorbent so that outgassing has been particularly critical. To compound these problems, these insulation systems have eroded so that their insulating characteristics have been significantly degraded.

Insulation blankets have also been used to provide garments, such as trousers, shirts, jackets and hats, for use by those who are subjected to environments having elevated temperatures. For example, fire fighters typically wear insulated garments to increase their comfort in proximity to a fire. Other persons, such as race car drivers and pilots, perform functions in environments wherein fires are more probable and can be particularly severe.

A garment commonly in use is made from an insulation fabric formed from nylon and treated in accordance with a process patented by DuPont. This fabric is commonly sold under the tradename "NOMEX". Although this fabric is nonirritating next to the skin and has characteristics for inhibiting the propagation of flame, it tends to decompose and otherwise degrade at temperatures above 750°F.

Insulation garments have also been formed from fabrics which have included asbestos. Asbestos has been undesirable since its fibers, if inhaled, can impregnate the lungs and cause disease. These asbestos garments have also been particularly heavy and have tended to crack when creased. They have been moisture absorbent and have tended to react chemically with some elements.

It has been desirable to provide fire walls between fire-producing environments and environments which are preferably protected from fire. For example, fire walls have been provided between wing fuel tanks and the fuselage of an aircraft. The specifications of the Federal Aeronautics Administration require that a fire wall be capable of withstanding temperatures of 1800°F. for a period of 10 minutes. These stringent criteria have typically been met by providing solid metal plates typically formed from steel having a density of 494 pounds per cubic foot. Due to this high density, fire walls have been extremely heavy, a characteristic which is particularly undesirable in aircraft applications.

SUMMARY OF THE INVENTION

In the present invention, the thermal insulation composite includes a skin sheet which can be spaced from a supporting surface by a plurality of filaments randomly interlocked in the configuration of a mat or wool. The wool may be used in a vacuum but typically the filaments will define interstices filled with a fluid such as air. The filaments in the wool are particularly long especially with respect to their cross-sectional diameter. For example, the ratio of their length to cross-sectional diameter may be as high as 12,500. Furthermore, the filaments can have a circular cross section so that adjacent filaments in the wool contact each other over a minimum area.

With this configuration, the filaments provide a long, torturous path offering considerable resistance to the conduction of heat. In fact, the thermal conduction of the filaments is so low that the heat transfer through the wool is primarily dependent upon the thermal conductivity of the fluid occupying the interstices of the filaments. These interstices are of minimal size so that the transfer of heat by forced or natural convection is practically non-existent.

With these highly desirable conduction and convection characteristics, the thickness of the insulation can be minimized to the extent that heat is transferred primarily by radiation between the skin sheet and the supporting surface. A significant number of radiation shields can be interposed between multiple layers of the wool to inhibit the transfer of heat by radiation without significantly increasing the thickness of the insulation.

The skin sheet, wool, and radiation shields can be formed from a material having a melting point above the temperature of particular environment. For example, at temperatures of 1000°F., the skin sheet can comprise a stainless steel screen, the radiation shields can comprise stainless steel foil, and the wool can be stainless steel wool. At higher temperatures, molybdenum, titanium, and other refractory metals may be particularly desirable.

The skin sheet, wool and radiation shields can be stitched or stapled to form an insulation blanket. Typically, the stitches and the staples will be spaced to provide a minimum number of conduction paths between the skin sheet and the supporting surface while maintaining the structural integrity of the insulation blanket.

The interstices of the filaments provide the wool with acoustic insulating properties which aare particularly advantageous. The wool is highly permeable and the interstices provide cavities of different sizes so that sound waves can be absorbed over a substantial band of frequencies. The thermal and acoustic properties of the insulation make it particularly desirable for use with aircraft such as helicopters.

One or more wool layers may be used, and each layer defines a multiplicity of interstices which preferably contain a gas having a low thermal conductivity. Since adjacent filaments of the wool contact each other substantially at a point, there is very little conduction of heat through the first filaments so that the thermal conductivity of the blanket is primarily determined by the conductivity of the interstitial gas. Depending primarily upon the size of the filaments, the particular maintaining means, and the density of the blanket, the thermal conductivity of the blanket can be as low as that of the interstitial gas. It follows that where air is the interstitial gas, the blanket can have a conductivity of 0.25 btu/hr-ft$^2$-°F.

This metal insulation is particularly desirable for high temperature environments, such as exhaust stacks wherein the insulation can be disposed on the interior surface of the stack. For example, the first skin sheet can contact the exhaust gases having an elevated temperature such as 1000°F., and the second skin sheet can be disposed in contiguous relationship with the structure of the stack. Due to the extremely low thermal conductivity of the insulation blanket, the second skin sheet may have a temperature of only 200°F. This is particularly important since the structure which contacts the skin sheet can be formed practically without regard for thermal criteria. Thus, the structure can be formed from relatively low density materials, such as fiber glass to maximize the structural characteristics of the stack while minimizing its weight.

If the duct is to transport a liquid fluid, it may be desirable to inhibit the flow of the liquid through the blanket. In such a case, at least one of the radiation barriers can be formed from stainless steel foil and disposed in contiguous relationship with the second filaments forming the first skin sheet. Alternatively, the interstices of the second filaments can be impregnated with a thermosetting resin.

Since heat catalyzes the oxidation of some metals, it may be desirable to provide at least the second filaments with an oxidation inhibiting coating. These filaments can be provided with a disilicide coating in accordance with a known process either before or after they are interwoven.

The insulation of the blanket is particularly desirable for use with a duct, especially in severe environments since it will neither crumble, spall, nor erode. The insulation blanket is not water absorbent and since it is thermally relieved, no provision need be made for thermal expansion.

The metal insulation blanket can be advantageously disposed on the leading edge of air foils and the like, which are subjected to high velocity impinging fluids. Since metals in general have negligible transmissibility, any transfer of radiant heat through the insulation blanket occurs generally due to reradiation. This reradiation can be inhibited by providing at least one of the radiation barriers. Such radiation barriers may be advantageously perforated so that the stagnant pressure of the impinging fluid is exerted upon the structure rather than the insulation. In a preferred embodiment, the radiation barriers are formed from stainless steel screen having a limited open area, such as 30%. The screen is preferably disposed intermediate the metal wool so that the first filaments of the wool substantially block the open areas of the screen. The first filaments can be provided with a diameter of only 4 microns to increase the dispersion of the radiant energy.

Foil barriers can also be disposed transverse to the first and second skin sheets to inhibit the flow of the impinging fluid interiorly of the insulation blanket. This will augment the pressure balance of the impinging fluid upon the structure of the air foil or nose cone.

Since the insulation blanket is highly flexible, it is easily adaptable for use as a fabric in providing a fireproof garment. This garment can be worn by race car drivers, test pilots, and fire fighters to maintain the user at a comfortable temperature even in the presence of flame which may have a temperature of 1600°F. Such a garment can be worn over conventional clothes or a lining of conventional fabric or "NOMEX" can be provided. If the insulation fabric is formed of stainless steel filaments, the fireproof garment can withstand temperatures of 2600°F. Additionally, due to the low density of the insulation blanket, the garment may have a weight of only eight pounds. Furthermore, since the garment is generally porous, it "breathes" to increase the comfort of the user.

An unexpected advantage of such a garment will be realized by military pilots who often are exposed to flak. Since the filaments can be interwoven to form a screen, and other portions or layers of filaments interlock to form a wool, the insulation blank provides resistance to penetration by small objects traveling at a comparatively high velocity. Thus, the garment not only provides protection from heat, but also provides resistance to anti-aircraft flak.

Moreover, the fact that the composite operates as an effective thermal insulation renders the material of the present invention usable as an effective protective garment for laser-type weapons, and as safety clothing where lasers are in use.

Fire walls can be formed from the insulation blanket. In an embodiment preferred for this use, the filaments are significantly interwoven to increase the structural characteristics of the skin sheets. If the layers of filaments are formed from stainless steel, the fire wall may have a density of only eight pounds per cubic foot. Thus, the weight of the fire wall can be reduced to only 4% of those of the prior art. Furthermore, the insulation blanket can have a thermal conductivity of only 0.25 btu/hr-ft$^2$-°F. so that the fire wall has a heat flow of only 0.16% of those of the prior art.

These and other features and advantages of the present invention will become more apparent with a detailed description of preferred embodiments such as those illustrated in the accompanying drawings.

DESCRIPTION OF THE DRAWINGS

FIG. 1 is a perspective view of a helicopter having an engine and rotor blades for exhausting the combustion gases of the engine;

FIG. 2 is a fragmentary perspective view of a rotor blade having insulation on the interior surface thereof;

FIG. 3 is a plan view of the insulation shown in FIG. 2;

FIG. 4 is an elevational view of the insulation taken on line 4—4 of FIG. 3 and including a layer of wool;

FIG. 5 is an enlarged perspective view of some of the filaments forming the layer of wool;

FIG. 6 is an elevational view of a further embodiment of the insulation;

FIG. 7 is a plan view of the insulation shown in FIG. 6;

FIG. 8 is a frontal elevational view of the insulation disposed transversely to sound attenuation chamber;

FIG. 9 is a cross-sectional view of the insulation and chambers taken on line 9—9 of FIG. 8;

FIG. 10 is a side elevational view of another embodiment of the insulation blanket of the present invention;

FIG. 11 is a perspective view of a fluid conducting duct including the insulation blanket illustrated in FIG. 10;

FIG. 12 is a cross-sectional view of the duct taken on line 12—12 of FIG. 11;

FIG. 13 is a perspective view of a further embodiment of the duct of the present invention;

FIG. 14 is a side elevational view of an airfoil having an insulation blanket disposed on the leading edge thereof;

FIG. 15 is a detailed view of that portion of the airfoil within the line 15—15 of FIG. 15;

FIG. 16 is a plan view of an airplane having a plurality of fire walls including the insulation blanket of the present invention;

FIG. 17 is a cross-sectional view of the fire wall taken on line 17—17 of FIG. 16;

FIG. 18 is a perspective view of a person wearing a fireproof garment formed from the insulation blanket of the present invention; and FIG. 19 is a cross-sectional view of a seam of the garment taken on line 19—19 of FIG. 18.

DESCRIPTION OF THE PREFERRED EMBODIMENT

A helicopter is shown generally in FIG. 1 and designated by the reference numeral 11. The helicopter 11 includes a frame 13 and an engine 15 attached to the frame 13 to provide motive power for the helicopter 11. At least one rotor blade 17 is operably coupled to the engine 15 and rotatably mounted on the frame 13 to provide a lifting force. The blade 17 can have a hollow configuration for receiving the combustion gases of the engine 15 near the root of the blade 17 and exhausting the combustion gases near the tip of the blade 17. The exhausting of combustion gases through the rotor blade 17 is particularly desirable to enhance the turning moment and hence the lifting characteristics of the blade 17.

The combustion gases of the engine 15 within the blade 17 can have an elevated temperature such as 1000°F. and an internal Mach number of 0.45. As previously discussed, it may be desirable to minimize the temperature of the blades 17 so that they can be formed from conventional lightweight materials. By lowering the temperature of the blades 17, the infrared signature of the helicopter 11 is also reduced so that the helicopter is less susceptible to infrared detection. This is particularly advantageous in military applications.

An insulation blanket 19 is disposed between the interior surface of each of the blades 17 and the combustion gases within the blades 17. Thus disposed, the insulation 19 maintains the interior surface of the blade 17 at a temperature such as 180°F. while contacting combustion gases having a temperature as high as 1000°F.

It will be apparent to those skilled in the art that the insulation 19 can be advantageously disposed between any two solids, liquids, or gases where it is desirable to maintain a difference in their temperatures. However, the insulation 19 is particularly adaptable for use in severe environments such as the rotor blades of a helicopter where vibration, thermal shock, and centrifugal forces may be encountered.

The insulation 19 typically includes a skin sheet 21 having a spaced relationship with a supporting surface such as the interior surface 22 of the rotor blade 17. A plurality of filaments 23 can be randomly bent and interwoven to form a wool shown generally at 25. The wool 25 is preferably disposed between the skin sheet 21 and the supporting surface 22 to maintain the spaced relationship thereof.

The insulation 19 can include attachment means such as the stitches 27 for maintaining the skin sheet 21 and the wool 25 in a contiguous relationship. The stitches 27 can be formed from thread having strands which include a suitable metal such as stainless steel. By sewing or otherwise attaching the wool 25 and the skin sheet 21, the insulation 19 is formed into a blanket which can be easily rolled and manipulated to augment the installation of the insulation 19 into its operable environment. In the preferred embodiment the stitches 27 are aligned in substantially parallel rows spaced a distance of one-half inch.

A scrim sheet 29 having bonding characteristics can be disposed between the insulation 19 and the supporting surface 22 to maintain the fixed relationship thereof. The scrim sheet 29 is preferably disposed on the side of the insulation 19 opposite the skin sheet 21. In the preferred embodiment the scrim sheet 29 has a thickness of 0.005 inches and includes an adhesive suitable for bonding the insulation 19 to the interior surface 22 of the rotor blade 17.

Three of the filaments 23 of the wool 25 are illustrated in FIG. 5 and substantially enlarged for the purpose of illustration. Each of the filaments 23 preferably has a much greater length than width. For example, the filaments 23 may have a length such as 2 inches and a diameter of only 4 microns. The filaments 23 are preferably relatively long so that heat being conducted by an individual one of the filaments 23 would follow a relatively long torturous path along the filament. It is well known that among filaments having the same cross-sectional area but different lengths, the least heat will be transferred by the longest filament. The filament strands 23 also preferably have a relatively small cross-sectional area; this also increases the resistance of a particular filament to the conduction of heat therethrough. In the preferred embodiment, the filaments 23 have a cross section the shape of a circle having a diameter such as 4 microns. Thus embodied, the filaments 23 will typically have a length to cross section diameter ratio such as 12,500.

The circular cross section of the filaments 23 is advantageous for another reason. It can be appreciated that heat will also be conducted between the filaments 23 which are in contact, hereinafter referred to as adjacent filaments. If the filaments 23 have a circular cross section, they will contact each other over a minimum area such as a point. For example, the wool 25 can include an adjacent pair of filaments 31 and 33 which are in contact at a point shown generally at 35. Thus, the filaments 23 can be configured to minimize the transfer of heat between adjacent filaments by providing the filaments 23 with a circular cross section. Other cross-sectional configurations which may be used include diamond, semi-circular, ovoid, and the like.

It can also be appreciated that the filaments 23 will define a plurality of interstices 37 within the wool 25. The interstices 37 may be filled with a liquid or gas, such as air, preferably having a low thermal conductivity, or the interstices may be defined in a vacuum. In either case, the conduction of heat through the interstices 37 can be minimized.

The long, narrow filaments 23 provide a significant resistance to the conduction of heat so that the thermal conductivity of the insulation 19 is substantially dictated by the thermal conductivity of the liquid or gas in the interstices 37. Thus, in a preferred embodiment wherein air is disposed in the interstices 37, the thermal conductivity of the insulation 19 may be only 0.24 btu/hr-°F.-ft²/inch.

If the insulation 19 is used in an environment wherein a fluid flows adjacent to the skin sheet 21, it may be desirable to perforate the skin sheet 21 so that the gas in the interstices 37 can be vented. This will reduce the distortion of the skin sheet 21 which might otherwise be caused by differences in the pressure of the fluid and the pressure of the gas in the interstices 37. The skin sheet 21 can include a plurality of wires woven in one of a variety of patterns to form a screen. In order to minimize the boundary layer of a fluid flowing adjacent to the skin sheet 21, the wires 39 of the screen are preferably disposed at an angle of 45° to the flow of the fluid represented by the arrow in FIG. 2.

When the insulation 19 is used in proximity to surfaces or fluids having elevated temperatures, it may be desirable that the skin sheet 21, the wool 25, and the thread forming the stitches 27 be formed from materials having a high melting point. Thus, in a preferred embodiment, the skin sheet 21 is a stainless steel screen, the stitches 27 are formed with stainless steel thread, and the wool 25 includes stainless steel wool. Molybdenum, titanium, and other refractory metals can be advantageously used in environments having temperatures above 3000°F.

Although metals are well known to have a relatively high thermal conductivity, the configuration of the filaments 23 which form the wool 25 minimizes the effect of this characteristic in the manner previously described. In fact, the conduction of heat through the wool 25 can be so insignificant that the transfer of heat through the insulation 19 is accomplished primarily by radiation. For this reason, the insulation 19 may include a multiplicity of radiation shields 43 preferably disposed between the skin sheet 21 and the supporting surface 22. The radiation shields 43 may comprise a foil having a thickness such as 0.0003 inches and will typically be formed from a metal such as stainless steel having a relatively high melting point.

The number of radiation shields 43 can be increased to further lower the heat transfer characteristics of the insulation 19. For example, the wool 25 can be formed into a plurality of adjacent layers such as the first and second layers 45 and 47, respectively. In such a configuration, one of the radiation shields 43 can be advantageously disposed between each of the adjacent layers such as the first and second layers 45 and 47, respectively.

Under some design criteria, it may be desirable that the thickness of the insulation 19 be maintained at a particular dimension such as one-quarter inch. Under such circumstances, the inclusion of an additional radiation shield 43 might be accompanied with the compression of the filaments 23 in the wool 25. This compression of the filaments 23 may increase the density of the insulation 19 and also increase the number of contacts between the filaments 23 so that the conductivity of the wool 25 is increased. Nevertheless, it has been found that the number of radiation shields 43 can be significantly increased to lower the overall heat transfer coefficient of the insulation 19 before the thermal conduction of the wool 25 becomes significant. For example, in a preferred embodiment wherein the filaments 23 have a cross-sectional diameter of 8 microns, the insulation 19 has a density of 7 lbs. per cubic foot and includes six radiation shields 43 to provide the insulation 19 with a heat transfer coefficient of 0.29 btu/hr-ft$^2$-°F. If the wool 25 is formed from filaments 23 of metal such as stainless steel, it will typically maintain the desired compressed configuration with the application of relatively small compressive forces. This is particularly desirable since in most cases the compression of the wool 25 can be accomplished with a pressure less than 1100 lbs. psi. Various combinations of filament size, insulation thickness, and number of shields are tabulated below with corresponding densities and heat transfer coefficients.

| Filament Cross Section Diameter (microns) | Insulation Thickness (inches) | Number of Shields | Wool Density (lb/ft$^3$) | K = BTU/hr-ft$^2$-°F/inch |
|---|---|---|---|---|
| 25 | .25 | 0 | 2.7 | 1.06 |
| 25 | .25 | 0 | 10.7 | .61 |
| 25 | .25 | 0 | 16.0 | .49 |
| 8 | .25 | 0 | 5.3 | .50 |
| 8 | .25 | 0 | 16.0 | .32 |
| 8 | .25 | 4 | 5.0 | .33 |
| 8 | .25 | 6 | 7.0 | .29 |
| 8 | .25 | 6 | 3.5 | .32 |
| 8 | .25 | 8 | 9.0 | .35 |
| 8 | .125 | 0 | 16.0 | .36 |
| 8 | .125 | 0 | 32.0 | .32 |
| 8 | .125 | 5 | 6.0 | .35 |
| 8 | .125 | 6 | 14.0 | .31 |
| 8 | .125 | 6 | 7.0 | .32 |

-continued

| Filament Cross Section Diameter (microns) | Insulation Thickness (inches) | Number of Shields | Wool Density (lb/ft$^3$) | K = BTU/hr-ft$^2$-°F/inch |
|---|---|---|---|---|
| 8 | .08 | 6 | 21.9 | .30 |
| 4 | .25 | 6 | 9.3 | .35 |
| 4 | .125 | 0 | 13.3 | .35 |
| 4 | .125 | 4 | 13.3 | .32 |

As an alternative to the stitches 27, a multiplicity of staples 49 can maintain in a contiguous relationship the skin sheet 21, the layers 45 and 47 of the wool 25, and the radiation shields 43. The staples 49 includes first portions 51 in substantial contact with one surface of the insulation blanket and second portions 53 in contact with the opposite surface of the insulation blanket 19. Third portions 55 of the staple 49 can extend through the skin sheet 21, the wool 25, and the radiation shields 43 to engage the first and second portions 51 and 53. In the preferred embodiment wherein the insulation 19 is disposed interiorly of the rotor blades 17, the first portions 51 comprising the crowns of the staple 49 are exposed to the elevated temperatures of the combustion gases and the second portions 53 comprising the feet of the staples 49 are in substantial contact with the interior surface 22 of the rotor blades 17.

It can be appreciated that the third portions 55 of the staples 49 provide a direct path for the conduction of heat between the first and third portions 51 and 53, respectively. It is desirable that these direct heat conduction paths be minimized without sacrificing the structural integrity of the insulation 19. This can be accomplished by spacing the staples 49 substantially as shown in FIG. 7. Thus, the first portions 51 of the staples 49 can be disposed to extend longitudinally in columns and transversely in rows. The staples 49 in the adjacent columns can be staggered to maximize the distance between the first portions 51 in the adjacent columns. In FIG. 6 it will be noted that the staples 49 in each of the columns are spaced a dimension equal to the length of the first portions 51 so that the third portions 55 are substantially aligned in the transverse direction. Although the transverse spacing of the staples 49 can be equal to the length of the first portions 51, any spacing can be effective. Various wire sizes, crown dimensions and transverse spacing may be used with a varying and predictable effect, which in part depends upon the geometric arrangement of the staples. Knowing the number and shape of wires per square inch penetrating the insulation, the diameter of the wire staples, the increase in conductivity may be calculated.

For example, assuming a ⅛ inch thick stainless steel wool, having a K = 0.32, the use of six wires per square inch, of 0.0007 inch diameter provides a total K of 0.35. For 0.010 inch wire under the same conditions, the total K is 0.38 using 10 wires per square inch rather than 6, provides a total K of 0.37.

The insulation blanket 19 also provides exceptional acoustic dampening characteristics. It can be appreciated that these characteristics are particularly advantageous when the insulation 19 is used in conjunction with aircraft or in other environments having a high degree of noise. It is known that sound is a cyclic pressure disturbance in a fluid such as air, where a periodic movement of the fluid molecules implements the pressurization-rarefaction cycles that comprise sound waves. A permeable material placed in a location of maximum fluid molecule movement will dissipate the energy in the sound wave and convert that energy to heat. Any conversion of energy in this manner results in the reduction of sound intensity.

One characteristic of a material which affects its sound dampening capability is the permeability of the material. If the permeability is too high, most of the sound will be reflected so that it cannot be absorbed. This high resistance to the penetration of sound waves tends to broaden the effective frequency range, but decrease the maximum absorption. In contradistinction, if a material has a low permeability, its absorption will be relatively high but over a relatively narrow frequency range.

As illustrated in FIG. 8, the insulation 19 including the wool 25 provides excellent sound attenuation in a gaseous media. The insulation 19 can be disposed transverse to a plurality of elongated chambers 57 which can be tuned in a known manner to attenuate a specific range of frequencies. Of particular importance is the fact that the chambers 57 can be defined by a honeycomb structure, shown generally at 59, such as that commonly used to form the rotor blades of a helicopter. Thus, with the insulation 19 operably disposed on the interior surface 22 of rotor blades 17 to take advantage of its superior thermal characteristic, it is also operably disposed to attenuate sound waves normally associated with the exhaust gases. A wide band of frequency absorption is one of the key advantages of the wool 25. This is primarily due to the fact that the interstices 37 of the wool 25 provide cavities of variable depth so that the wool 25 is effective over a virtually infinite band of frequencies. The multiple layers of the wool 25, such as the layers 45 and 47, can be configured of filaments 23 having different diameters so that the size of the interstices 37 varies among the layers. Furthermore, the permeability of the insulation 19 can be varied by compaction to the density desired.

The insulation as disclosed herein has significant thermal and acoustic properties. The filaments 23 which form the wool 25 are provided with a circular cross section to minimize the transfer of heat between adjacent filaments. The filaments 23 can have a cross sectional diameter as small as 4 microns so that the conduction of heat along the filament is minimized. Furthermore, by providing the filaments 23 with a significant length, a long torturous path is defined which further inhibits the conduction of heat. With the conductivity of the filament substantially reduced, the fluid, which is typically disposed in the interstices 37, primarily determines the thermal conductivity of the insulation 19. A fluid such as air can be chosen so that the thermal conductivity of the insulation 19 may be 0.29 but/hr-ft$^2$-°F./in.

Since the insulation has such a low conductivity, its thickness can be advantageously reduced so that heat is transferred through the insulation primarily by radiation. The wool can be formed into layers which can be alternated with the radiation shields 43. Within a thickness of only one-quarter inch, the wool 25 can be compressed to advantageously provide for a substantial number of the shields 43. In this manner, the radiation of the insulation is also substantially inhibited.

The insulation 19 can be stitched or stapled at discrete locations to form a blanket having a high degree of structural integrity. Furthermore, each of the elements of the insulation can be formed from stainless steel, molybdenum, and other refractory metals so that the insulation is particularly useful in environments having elevated temperatures.

The interstices of the filaments provide cavities of different sizes to that sound waves permeating the insulation can be absorbed over a substantial band of frequencies. The insulation can be used in proximity to acoustic chambers which can be tuned to further attenuate a particular band of frequencies.

In the form shown in FIG. 10 the blanket 61 typically includes a multiplicity of first filaments 63 which are randomly, anisotropically interlocked with each other to form at least one layer of a wool 65. A plurality of second filaments 67 can be interwoven to define a skin sheet, such as a first screen 69, on one side of the wool 65. Similarly, a plurality of third filaments 71 can be interwoven to define a skin sheet, such as a second screen 73 on the other side of the wool 65.

The first filaments 63, have a generally kinky configuration, are snarled together so that the wool 65 has a significant structural integrity even by itself. The first filaments 63 have a significant length to cross-sectional diameter ratio so that the conduction of heat along the filaments 71 is substantially inhibited. The filaments 63 have a circular cross section so that the area of contact between adjacent pairs of the filaments 63 is reduced to substantially a point. In this manner, the conduction of heat between adjacent filaments 63 can be significantly reduced. In a preferred embodiment, the filaments 63 have a length of 2 inches and a cross-sectional diameter of 4 microns.

The interstices of the first filaments 63 which form the wool 65 are preferably filled by a gas, such as air, having a relatively low thermal conductivity. Since the conduction of heat through the filaments 63 can be significantly inhibited, as previously discussed, the thermal conductivity of the wool 65 can be made primarily dependent upon the thermal conductivity of the interstitial gas.

This being the case, the filaments 63, 67, and 71 can be formed from substantially any material to meet other design criteria. For example, the filaments 63, 67, and 71 can be formed from metals having a relatively high melting point so that the blanket 61 can be used in environments having extreme temperatures. The highest temperatures at which a particular material can perform its intended function in a particular environment will hereinafter be referred to as the service temperature of the material. For a material forming the filaments 63, 67, and 71 in the blanket 61, the service temperature will usually be the melting point of the material.

In a preferred embodiment, the filaments 63, 67, and 71 include stainless steel so that the blanket 61 has a service temperature of 1200°F. The filaments 63, 67 and 71 can also be formed from molybdenum, tantalum, columbium, and other refractory metals or metal oxides to raise the service temperature of the blanket 61 to as much as 4000°F. Even though the blanket 61 is formed from metal, the thermal conductivity of the blanket 61 is still primarily dependent upon the thermal conductivity of the interstitial gas so that the conductivity of the blanket 61 will typically be only 0.25 btu/hr-ft$^2$-°F.

In some environments, the transfer of heat by radiation is significant so that it is desirable to provide at least one radiation barrier 75 between the first and second screens 69 and 73, respectively. Where it is desirable that more than one radiation barrier 75 be provided, the wool 65 can be formed into a plurality of layers and one of the barriers 75 can be disposed between each of the adjacent layers.

Radiant energy is typically transferred in two manners. First, one particle can radiate energy to heat another particle which will in turn reradiate the energy to heat a third particle. This manner of heat transfer is typically referred to as reradiation. Heat can also be transferred by the radiation of energy through a particle. The extent to which this takes place is dependent upon the transmissibility of the particle. Metal is well known to have a negligible transmissibility so that metal radiation barriers are particularly desirable. Furthermore, it may be desirable that the radiation barriers 75 be formed from a generally planar sheet material so that the barriers 75 can extend between the first and second screens 69 and 73, respectively, in substantially all areas of the blanket 61. In a preferred embodiment, the radiation barriers 75 are formed from stainless steel foil having a thickness of 0.0005 inches.

The effectiveness of the radiation barriers 75 may be substantially increased by use of metals or materials having a low emissivity, either as a thin foil or screen or as a coating on a foil or screen. Materials of low emissivity are known and include, by way of example, gold, copper, chromium, platinum, silver, zinc, rhodium, rhodium-iridium alloys, and the like. The selection of the particular metal or alloy is a function of the anticipated temperature to which it is exposed.

Fastening means can be provided to maintain the filaments 63, 67, and 71 in a substantially fixed relationship. This fastening means may include staples 77, wire whiskers, or stitches formed from thread. These particular fastening means are desirably formed from metals, such as stainless steel or some other material having a relatively high service temperature. The assembly may also be welded together.

One highly desirable feature of the insulation blanket is its low density. Since most of the blanket is occupied by the interstitial gas, the density of the blanket 61 may be as low as 8 pounds per cubic foot. This relatively low density makes the blanket 61 particularly advantageous for use in aircraft applications.

A particular application might be that associated with a duct illustrated in FIGS. 11 and 12 and designated generally by the reference numeral 83. The duct 83 can be of the type typically including a structural member 84 and defining a passageway 85 for transporting a fluid from one location to another. If the temperature of the conducted fluid is significantly high, it is generally desirable that the materials forming the duct 83 have a correspondingly high service temperature. For this reason, hot fluid ducts of the prior art have typically included metal structural members 84. Where these ducts 83 have been uninsulated, the outer surface of the structural member 84 has become very hot. Of course, this has been undesirable when people or other burnable objects have been exposed to the hot fluid ducts 83. As a consequence, various insulations have been disposed in contact with the outer surface of the metal structural member 84.

Though it is apparent that the blanket 61 can be similarly disposed on the outer surface of the structural member 84, it is of particular interest that the blanket 61 can also be disposed interiorly of the member 84 to accomplish the same objectives. Thus, the blanket 61 can be disposed with the first screen 69 defining the passageway 85 and contacting the hot fluid. Due primarily to the high strength of the fastening material 77 and their interlocking characteristics, the blanket 61 will not erode, crack, spall, outgas, or otherwise be adversely affected by its contiguous relationship with the fluid.

In some applications, the generally porous characteristics of the wool 65 and the screens 69 and 73 can be of advantage. This characteristic enables pressures within the blanket 61 to be vented to the regions exterior of the blanket 61.

It will be noted that even though the first screen 69 may become relatively hot as a result of its contact with the fluid, the wool 65 can maintain the second screen 73 at a significantly cooler temperature. This will enable the structural member 84 to be formed from any material substantially without regard to its thermal characteristics. Whereas the structural members 84 of the prior art have been formed of relatively heavy metals in order to withstand the temperatures of the hot fluids, the structural member 84 in this embodiment of the present invention can be formed from less expensive and lower density materials, such as glass fibers and epoxy, plastic or aluminum.

In some ducts 83 the hot fluid will be a liquid in which case it may be desirable to place an impermeable material, such as foil, in substantially planar contact with the first screen 69. This impermeable foil can be one of the radiation barriers 75 previously discussed. In this preferred position, the radiation barrier 75 can also provide means for inhibiting the passage of the fluid through the blanket 61 to the duct 83.

Due to the significant structural characteristics of the insulation blanket 61, the duct 83 can be formed from the blanket 61 without the structural support of the member 84. Such an embodiment is shown in FIG. 13 wherein it is also illustrated that filaments 71 forming the second screen 73 can be impregnated with a sealant 90, such as a rubber mastic, to prohibit the flow of the fluid through the blanket 61. To further reinforce this embodiment of a hot fluid duct, a filament, such as aluminum wire 92, can be spirally wound preferably outwardly of the second screen 73. Further structural support can be provided by placing an annular ring stiffener 94 in each of a plurality of radial planes spaced along the duct 83. The ring stiffeners 94 can be disposed in contact with the second screen 73 to maintain the circular cross section of the duct 83.

In accordance with any of the foregoing embodiments, the hot fluid duct 83 can be provided from materials having a lower weight and a higher ballistic tolerance than the insulated ducts of the prior art. Furthermore, since the blanket 61 is relatively flexible, it is vibration damped and thermal shock resistant. The multiplicity of interstices in the wool 65 also provide significant acoustic reductions which can be appreciated when the blanket 61 is used as the exhaust stack of an engine.

The duct 83 including the blanket 61 can be particularly advantageous when used as an exhaust stack for an aircraft engine. The blanket 61 can maintain the outer surface temperature of the stack as low as 180°F. even when the exhaust gases have a temperature as high as 1000°F. This will substantially reduce the infrared signature of the exhaust stack and thereby inhibit the detection of the associated aircraft during periods of darkness. The cooler exhaust stack will also be substantially invisible to heat-seeking missiles.

The insulation blanket 61 can also be advantageously disposed to protect the leading edges of airfoils, and other aerodynamic surfaces. For example, the blanket 61 can be disposed on a leading edge 101 of the airfoil 103 illustrated in FIG. 14. As the airfoil 103 travels at significant speeds, the air which travels in the relative direction illustrated by the arrow 105, impinges upon the leading edge 101 of the airfoil 103. At significant relative speeds between the air and the airfoil 103, this will cause the leading edge 101 to heat if it is not protected by some type of insulation. The insulation blanket 61 is particularly adaptable for this purpose.

The significant insulating qualities of the blanket 61 have already been discussed, but there are other features of the blanket 61 which make it additionally advantageous in this environment. It will be apparent that at high relative speeds, the air may exert a significant pressure upon the insulation blanket 61. This pressure is greatest at the leading edge 101 and decreases along the surface of the airfoil 103 with progressive positions from the leading edge 101.

If the radiation barriers 75 include a solid sheet of material, such as stainless steel foil, the significant pressures on the blanket 61 will force the barriers 75 toward the leading edge 101 so that the filaments 63 therebetween are significantly compressed. This, of course, will increase the density of the wool 65. Although compression of the wool 65 may ultimately increase the area of contact between the adjacent filaments 63, it was particularly surprising to find that the wool 65 could be compressed to a density as high as 40 pounds per cubic foot without significantly altering the thermal conductivity of the blanket 61.

Even though a significant amount of compression may be tolerable, it may be desirable in some embodiments to form the radiation barriers 75 of a perforated material. This will enable the air to pass through the blanket 61 so that the static pressure exerts a force directly upon the leading edge 101 as illustrated by the arrow designated P in FIG. 15. The arrow designated T illustrates that even though the pressure may be greatest at the leading edge 101, the temperature will generally be greatest at the first screen 69. Even with the radiation barriers 75 perforated, it has been found that the filaments 63 of the wool 65 will substantially fill the perforations so that the resistance of the barriers 75 to the transfer of heat by radiation is not significantly reduced. In fact, the filaments 63 typically disperse the radiant energy so that the transfer of heat even by reradiation is significantly reduced. In a preferred embodiment, stainless steel screens provide the perforated radiation barriers 75, and the open area of these screens is limited to 30%. This open area can often be reduced by calendering the screen after it has been woven.

As noted, the pressures on the surface of the airfoil 103 typically diminish with progressive positions from the leading edge 101. As a result of these pressure differentials, there may be an undesirable flow of air from the leading edge 101 along the surface of the airfoil 103 within the blanket 61. For this reason, a preferred embodiment of the blanket 61 includes transverse barriers 110 which are disposed to extend between the first and second screens 69 and 73, respectively. The barriers 110 will typically be formed from a planar material which is relatively impervious to the flow of air therethrough. In a preferred embodiment, the barriers 110 are formed from stainless steel foil and disposed in planes substantially perpendicular to the first and second screens 69 and 73, respectively.

In addition to its significant insulating qualities, the blanket 61 is particularly desirable for use with aerospace applications because of its low density. Low weight is always a design goal for objects which must be initially lifted into outer space.

Referring now to FIG. 16, the use of the present invention as a fire wall is illustrated. For example, a typical airplane 113 includes a fuselage 114 supporting a pair of wings 117. At least one fuel tank 119 is generally enclosed in each of the wings 117, and engines 120 are typically mounted on the wings 117. The fire producing environments, engines and fuel tanks, are generally separated from each other by a fire wall 121. It is also desirable that any fire which may occur within the wings 117 be inhibited from spreading to the fuselage 114 of the airplane. For this reason a fire wall 123 is typically disposed between the wings 117 and the fuselage. The Federal Aeronautics Administration requires that the fire walls 121 and 123 be capable of withstanding temperatures of 800°F. for a period of 10 minutes.

In a preferred embodiment of the fire wall in accordance with this invention, the fire walls 121 and 123 each include a nominal supporting structure 125 (FIG. 17) and the insulation blanket 61 disposed with the second screen 73 in substantially planar contact with the supporting structure 125. The insulation blanket 61 is preferably disposed on the side of structure 125 facing the heat producing environment so that the supporting structure 125 can be formed from materials selected for their low density and high strength characteristics.

Since the insulation blanket 61 has a significant strength of its own, the supporting structure 125 may be neither needed or desired. To increase the strength of the blanket 61, either one or both of the screens 69 and 73 can be provided with a close high-density weave, such as the twilled dutch weave, to reduce any tendency of the screens 69 and 73 to bend. The provision of solid foil radiation barriers 75 may be desirable to inhibit the passage of flame through the blanket 61.

In comparison to solid steel fire walls of the prior art, the fire walls 121 and 123 of the present invention provide a reduction in weighht of 96%. This feature makes the fire walls highly desirable for use in aircraft. Furthermore, since the insulation blanket 61 can have a thermal conductivity of only 0.25 btu/hr-ft$^2$-°F., the heat flow thorugh the fire walls is only 0.16% of the heat flow through the solid metal fire walls of the same weight.

Fire resistant wearing apparel is particularly advantageous for use by persons, such as firemen who commonly confront fire. Even persons such as race car drivers and pilots who increase the probability that they will be present in a fire, typically wear some type of garment formed from a fire-reistant fabric. The insulation blanket 61 is highly desirable for use as such an insulating fabric because of its high flexibility, and its significantly high service temperature. For example, FIG. 18 shows a garment 130 formed from portions of the blanket 61 and the portions joined at seams, such as the seam designated by the reference numeral 131. The seam 131 can be formed from any of the retaining means discussed but a plurality of stitches formed from metallic thread 135 may be the most desirable.

To enhance the comfort of the user, the garment 130 can be worn over other apparel, or it can be lined by another fabric 140, such as that manufactured by DuPont under the tradename "NOMEX". In such an embodiment including a lining, the fabric 140 can be bonded to the second screen 69 by any suitable adhesive. The radiation barriers 75 can be advantageously formed from an impervious planar material such as foil to inhibit the passage of any flammable or non-flammable liquid through the garment 130.

Another feature of the blanket 61 will be particularly appreciated by military pilots who are sometimes subjected to flak and other projectiles traveling at relatively high velocities. Due primarily to the significant strength of the interwoven filaments 67 and 71, and the interlocked filaments 63, the blanket 61 is highly resistant to flak penetration. Furthermore, the blanket 61 will not spall or crack.

For long-period occupancy, it is particularly advantageous that the garment 130 can have a significantly low weight of less than 8 pounds. Furthermore, if the radiation barriers 75 are perforated, the garment 130 will "breathe" so that it can be worn comfortably for long periods of time.

Since the blanket 61 can be formed from materials having a service temperature as high as 4000°F., the maximum temperatures within which the garment 130 can protect the individual will depend primarily upon the thermal conductivity of the blanket 61 and the temperature tolerance of the individual.

In accordance with the invention hereinabove described, an insulation blanket can be formed from materials having a service temperature as high as 4000°F. to provide a thermal conductivity of only 0.25 btu/hr-ft$^2$-°F. Barriers to inhibit the transmission of radiant energy through the blanket can be made impervious to inhibit the passage of flame or fuel through the blanket. Alternatively, the radiation barriers can be perforated to vent the regions interior of the blanket and enable static pressures to be exerted on adjacent structural members. In the absence of adjacent structural members, the screens 69 and 73 of the blanket 61, can be closely woven to inhibit their bending.

In the foregoing description, reference has been made to mesh members and foil or imperforate thin metal sheets. Various types of meshes may be used of various mesh numbers, wire diameters and weave types. The usual designation of mesh is with reference to the number of openings per lineal inch. By way of example, a 400 mesh material has openings of approximately 0.0015 inches with a nominal wire diameter of 0.0010 inches, while a mesh designated as a 30 mesh has an opening of 0.0234 inches, with a wire diameter of approximately 0.0154 inches. The above designations are based on the U.S. Sieve Series. As is known, the open area of the mesh may be calculated from a standard known formula. Meshes of various sizes may be used, as well as meshes of various weaves. Typically, mesh materials are available commercially in stainless steel and in sizes as small as 500. When assembled into a composite, the meshes may be laid up in a superimposed pattern or oriented 45° with respect to each other. One composite may include mesh members of the same or different mesh size.

Where foils are used, they may be of the dimensions previously noted, and may be of the same or different metals as the remaining components of the composite. This is likewise applicable to the mesh members. For example, where insulation of the present invention is to be exposed to relatively high temperatures, on one surface, and there is a relatively low temperature on the other surface, materials such as aluminum may be used on the low temperature side of the composite, while stainless steel may be used on the high temperature side, or refractory metals and oxides if the high temperature zone is sufficiently high to warrant the use of these types of high temperature materials.

The insulation composite of the present invention may also be associated with other materials. For example, in the formation of a fire suit, the thermal composite includes two spaced wire meshes with the wool assembled therebetween. On the outer exposed surface of each of the wire meshes, a material such as NOMEX may be assembled by stitching through the entire assembly of NOMEX, steel mesh and wool in a quilt cross pattern using thread of NOMEX. In this particular instance, it may be desirable separately to stitch the mesh and wool thermal insulation blanket using stainless steel wire in order to provide additional strength to the resulting fire fabric. When used as fireproof apparel, the insulation of the present invention is preferably arranged such that a fire retardant fabric e.g. NOMEX is assembled to that portion of the composite closest to the wearer's body.

The wool may be of various densities, for example from 2 lbs. per cubic foot to 34 lbs. per cubic foot, the various densities being achieved by compacting the loose fluff under pressure. As representative of the weights of this material, ⅛ inch thick stainless steel wool insulation may vary in weight from 0.02 lbs. to 0.34 lbs per square foot.

A typical insulation representative of the variations possible includes seven alternate layers of wool having a filament size of eight microns and a weight of 3 oz. per square yard with six interleaved aluminum sheets of 0.005 inch cross-section. The number of layers in the composite, as well as the weight of the wool may be varied. The effect is to vary the thermal conductivity of the insulation, K, as expressed in btu/hr-ft$^3$-°F./in. If desired, mesh members may be used as the outer components in order to provide additional structural integrity to the thermal insulation. A typical such arrangement involves six layers of stainless steel wool of eight micron diameter strands and having a density of 10 lbs. per cubic foot. Interleaved between each of the layers of stainless steel wool is a foil of 0.0005 inch cross-sectional dimension. The last described composite has on each side of it a number 50 mesh screen in which the individual wires are of 0.009 inches in diameter. The weight of such a composite is approximately 1 lb. per square foot. This particular composite has been used successfully to reduce the infrared signature on exhaust stacks for aircraft type power systems.

It will be apparent that there are several different ways of maintaining the structural and functional components of the composite assembled in fixed relationship. Previously, stitching, stapling have been described, and spot welds may also be used as well as the more sophisticated welding techniques such as lazer welding and the like. Where welded, the weld may be entirely through the composite, or selectively to components of the composite such that one component is welded to a second, a second is welded to a third and a third is welded to a fourth and so forth such that the resulting composite has structural integrity.

One of the advantages of the thermal insulation described is that it may be fashioned to fit a myriad of different and complex shapes, and possesses significant structural strength and resistance to environmental conditions which would normally preclude the use of some of the conventional known thermal insulation materials. Of singular advantage is the relative lightweight of the thermal insulation composite of the present invention and the ability to be used in high temperature environments.

The use of an all metal thermal insulation offers significant practical advantages because of ease of fabrication into a variety of different and oft complex shapes. For example, a layer of wool may be affixed to a skin sheet in the form of a foil or mesh by stitching or stapling, a relatively simple procedure. Alternately, welds may be used. The resulting composite may be shipped in roll form and assembled on site.

A typical such use is external insulation for fuel tanks and drums. A thickness of only 0.035 inches will prevent burn through and rupture in a fuel tank totally immersed in a 2000°F. fuel fire. This may be accomplished with a thermal insulation weight of 0.1 lbs./ft.$^2$ and the insulation may be bonded either to metal or flexible wall tank configurations.

When used in oxidative conditions, one or more or all of the components of the composites, including the wool, may be coated with materials such as chromium, rhodium, iridium, platinum, their alloys, and the like by vapor deposition procedures.

In environments of high altitude and aerospace applications where there is low pressure, the oxidation at high temperature, as measured by weight gain is relatively low, e.g. 1 psia, 2000°F. to provide a weight gain of 8% after 25 hours of continuous use.

Under certain circumstances, the foil or mesh may be convoluted, and if arranged in layers of foil or mesh and wool, the convolutions in each strata may be off-set or arranged at right angles or on the diagonal.

The thermal insulation of this invention also provides low infrared signature and thus may be assembled to exhaust stacks of aircraft power plants and to armaments having a high rate of fire e.g. Gatling guns and the like.

When used with aircraft power plants, a layup of foil and wool, or mesh and wool is assembled to the interior or exterior or both of the exhaust stack. Due to the ability of the thermal insulation of this invention to be fabricated into structural shapes, the exhaust stack may be constructed of thermal insulation of this invention affixed to a mounting flange with the foil member forming a fluid impermeable duct.

The insulation of the present invention may also be used to enhance uniform cooling of externally cooled engine compartments for aircraft and the like. The ability to withstand high G loads and to withstand vibrational stresses offer advantages in this and other installations.

While the thermal insulation of this invention has been described principally with reference to high temperatures, e.g. 500° to 4000°F., it also finds use in the cryogenic temperature range. Moreover, the ability to be fabricated into different shapes renders the composites described useful as thermal insulation in the chemical process industry, especially because of the good corrosion resistant qualities of the metals and alloys such as stainless steel and the like. In these instances a high weight and bulk are factors, the material of the present invention offers distinct advantages, as do the properties of fabrication into structural shapes and relative ease of installations either as original equipment or as an added modification to already existing structures.

The specific forms of the present invention have been described with reference to particular materials and arrangements of materials, it will be apparent to those skilled in the art that many variants may be advantageously used in any of the particular applications in which thermal insulation is needed. Furthermore, the preferred forms discussed are merely representative of the many embodiments of the present invention. For this reason, the scope of the invention should be ascertained with reference to the following claims.

What is claimed as the invention is:

1. A thermal insulation comprising:
   a first skin sheet of metal adapted to be positioned in a spaced relationship to a supporting structure;
   a plurality of randomly interlocked fine metallic filaments affixed to said first skin sheet for positioning between said skin sheet and the supporting structure;
   said metallic filaments being formed of a heat-conductive metal;
   said filaments having a length which is substantially greater than the width of said filaments to provide a high resistance to conductive heat flow along the lengths of said filaments, and
   said filaments having a shape which minimizes the contact area between adjacent filaments to reduce conductive heat flow between adjacent filaments,
   whereby the heat-conductive metal in said insulation functions to achieve effective insulation by forcing heat flow through said insulation to traverse long heat flow paths along the lengths of said metallic filaments.

2. The insulation set forth in claim 1 wherein said filaments are arranged in at least a pair of layers and the insulation further comprises a radiation shield means interposed between the layers in each of the pairs of layers.

3. The insulation recited in claim 1 further comprising means forming a second skin sheet, and
   means for retaining the first and second skin sheets and the filaments in a substantially fixed relationship, the retaining means including portions thereof extending along the first and second skin sheets.

4. The insulation defined in claim 1 wherein the filaments have properties for deforming to a particular configuration in response to a compressive force and for substantially maintaining the particular configuration after the compressive force is removed.

5. The insulation set forth in claim 1 wherein the filaments have a substantially circular cross section so that adjacent strands contact each other substantially at a point.

6. The insulation set forth in claim 1 wherein the filaments include a non-combustible metallic material.

7. The insulation recited in claim 6 wherein the filaments include a refractory metal.

8. The insulation recited in claim 6 wherein the filaments include stainless steel.

9. The insulation as set forth in claim 3 wherein at least one of said skin sheets is metallic mesh member.

10. The insulation as set forth in claim 3 wherein at least one of said skin sheets is a metallic foil member.

11. The insulation as set forth in claim 1 wherein said plurality of filaments are arranged in at least two separate layers, and metallic means disposed between adjacent layers of filament.

12. The insulation as set forth in claim 11 wherein said metallic means is metallic foil.

13. The insulation as set forth in claim 12 wherein said foil includes at least one surface having low emissivity.

14. The insulation as set forth in claim 1 wherein said filaments have a diameter of between 4 and 25 microns,
    said plurality of filaments having a density of between 2 and 34 pounds per cubic foot.

15. The insulation as set forth in claim 1 wherein said plurality of filaments form a plurality of void spaces between adjacent filaments, and
    said void spaced functioning as stagnant gas spaces.

16. A thermal insulation composite comprising:
    a first metal skin sheet;
    a second metal skin sheet spaced from said first skin sheet;
    first metallic means disposed between said first and second skin sheets and operative to reduce the transfer of heat between said skin sheets;
    said first metallic means including a plurality of randomly interlocked fine metallic filaments;
    said metallic filaments being formed of a heat-conductive metal;
    said filaments having a length which is substantially greater than the width of said filaments to provide a high resistance to conductive heat flow along the lengths of said filaments;
    said filaments having a shape which minimizes the contact area between adjacent filaments to reduce conductive heat flow between adjacent filaments, and
    means to maintain said skin sheets and said metallic means in a fixed relationship,
    whereby the heat-conductive metal in said insulation functions to achieve effective insulation by forcing heat flow through said insulation to traverse long heat flow paths along the length of said metallic filaments.

17. The insulation set forth in claim 16 wherein the filaments are disposed to form at least a pair of layers of the wool.

18. The insulation recited in claim 16 wherein said maintaining means includes metallic thread for sewing the insulation so that the first and second skin sheets and the first means are maintained in a substantially fixed relationship.

19. The insulation set forth in claim 16 wherein said maintaining means includes staples.

20. The insulation as set forth in claim 17 further including a foil member interposed between adjacent layers of wool.

21. The insulation as set forth in claim 16 wherein the first skin sheet forms the "hot" side of said insulation, said second skin sheet being at a temperature less than said first, and the components of said insulation being stainless steel.

22. The insulation as set forth in claim 21 wherein at least one of the skin sheets is a mesh member.

23. A thermally insulated structure comprising:
    thermal insulation means including spaced members defining skin sheets;
    said skin sheets having a plurality of randomly interlocked fine metallic filaments disposed therebetween;
    said skin sheets being metallic;
    said metallic filaments being formed of a heat-conductive metal;
    said filaments having a length which is substantially greater than the width of said filaments to provide a high resistance to conductive heat flow along the length of said filaments;
    said filaments having a shape which minimizes the contact area between adjacent filaments to reduce conductive heat flow between adjacent filaments;
    said matted filaments providing a multiplicity of minute fluid spaces operative to reduce the transfer of heat between said skin sheets;
    means defining a member to be insulated thermally, and
    said insulation means being so disposed relation to said means that one of said skin sheets is spaced from said means and said matted filaments are disposed between said one skin sheet and said member to be insulated,
    whereby the heat-conductive metal in said insulated structure functions to achieve effective insulation by forcing heat flow through said insulation means to traverse long heat flow paths along the length of said metallic filaments.

24. The structure as set forth in claim 23 wherein said member is a conduit.

25. The structure as set forth in claim 24 wherein said insulation means is disposed on the outer surface of said conduit.

26. The structure as set forth in claim 23 wherein said member is a fire retardant fabric.

27. The structure as set forth in claim 26 wherein said other skin sheet is in contact with a second fire retardant fabric spaced from the first fire retardant fabric.

28. The structure as set forth in claim 23 wherein said member is a metal member.

29. The structure as set forth in claim 28 wherein said member has hot fluids flowing in contact therewith.

30. The structure as set forth in claim 29 wherein said fluids are gaseous and said thermal insulation is positioned on the surface of said member other than that contacted by said gas, said insulation being operative to reduce substantially the infrared signature of said metal member.

31. The structure as set forth in claim 28 wherein said thermal insulation is mounted on said metal, and wherein hot fluids flow across the exposed surface of said thermal insulation.

32. The structure as set forth in claim 31 wherein said fluid is hot gas, and wherein said thermal insulation is operative to reduce the infrared signature of said metal member.

33. The structure as set forth in claim 23 wherein said matted filaments are arranged in layers of matted filaments.

34. The structure as set forth in claim 33 wherein radiation shield means are disposed between adjacent layers of said matted filaments.

* * * * *